(12) United States Patent
Edwards et al.

(10) Patent No.: US 9,674,298 B1
(45) Date of Patent: Jun. 6, 2017

(54) EFFICIENT ACCESS TO SPARSE PACKETS IN LARGE REPOSITORIES OF STORED NETWORK TRAFFIC

(71) Applicant: FireEye, Inc., Milpitas, CA (US)

(72) Inventors: Dennis Lee Edwards, Crozet, VA (US); Christopher Hayes Fauerbach, Midlothian, VA (US)

(73) Assignee: FireEye, Inc., Milpitas, CA (US)

( * ) Notice: Subject to any disclaimer, the term of this patent is extended or adjusted under 35 U.S.C. 154(b) by 0 days.

(21) Appl. No.: 15/368,352

(22) Filed: Dec. 2, 2016

Related U.S. Application Data

(63) Continuation of application No. 14/614,985, filed on Feb. 5, 2015, now Pat. No. 9,537,972.

(60) Provisional application No. 61/942,370, filed on Feb. 20, 2014.

(51) Int. Cl.
*H04L 12/26* (2006.01)
*H04L 29/08* (2006.01)

(52) U.S. Cl.
CPC ........ *H04L 67/2852* (2013.01); *H04L 43/106* (2013.01); *H04L 69/324* (2013.01)

(58) Field of Classification Search
None
See application file for complete search history.

(56) References Cited

U.S. PATENT DOCUMENTS

| | | | |
|---|---|---|---|
| 6,654,760 B2 | 11/2003 | Baskins et al. | |
| 2003/0135612 A1 | 7/2003 | Huntington et al. | |
| 2011/0022624 A1 | 1/2011 | Luk et al. | |
| 2011/0128960 A1 | 6/2011 | Bando et al. | |
| 2011/0200331 A1 | 8/2011 | Li et al. | |
| 2011/0216774 A1 | 9/2011 | Nevil et al. | |
| 2012/0047181 A1 | 2/2012 | Baudel | |

(Continued)

FOREIGN PATENT DOCUMENTS

WO    WO-2011060368 A1    5/2011

OTHER PUBLICATIONS

Berkeley Packet Filter (BPF) Syntax, taken from the man page of pcdump, Jul. 19, 2014, (11 pages).

(Continued)

*Primary Examiner* — Otis L Thompson, Jr.
(74) *Attorney, Agent, or Firm* — Cesari and McKenna, LLP

(57) ABSTRACT

A secondary indexing technique cooperates with primary indices of an indexing arrangement to enable efficient storage and access of metadata used to retrieve packets persistently stored in data files of a data repository. Efficient storage and access of the metadata used to retrieve the persistently stored packets may be based on a target value of the packets over a search time window. The metadata is illustratively organized as a metadata repository of primary index files that store the primary indices containing hash values of network flows of the packets, as well as offsets and paths to those packets stored in the data files. The technique includes one or more secondary indices having a plurality of present bits arranged in a binary format (i.e., a bit array) to indicate the presence of the target value in one or more packets stored in the data files over the search time window. Notably, the present bits may be used to reduce (i.e., "prune") a relatively large search space of the stored packets (e.g., defined by the hash values) to a pruned search space of only those data files in which packets having the target value are stored.

23 Claims, 6 Drawing Sheets

(56) References Cited

U.S. PATENT DOCUMENTS

| 2012/0158737 | A1 | 6/2012 | Levy et al. |
| 2012/0239652 | A1 | 9/2012 | Wood et al. |
| 2015/0043351 | A1 | 2/2015 | Ohkawa et al. |
| 2015/0055481 | A1 | 2/2015 | Guo et al. |
| 2015/0156213 | A1 | 6/2015 | Baker |

OTHER PUBLICATIONS

Capsa Real-time Portable Network Analyzer User Guide (Professional Edition), Colasoft LLC, 2013 (100 pages).
Capsa Real-time Portable Network Analyzer Datasheet (Enterprise Edition), Colasoft LLC, 2014 (5 pages).
Capsa Real-time Portable Network Analyzer White Paper (Professional Edition), Colasoft LLC, 2014 (13 pages).
Carstens et al., Programing with PCAP, http://www.tcpdump.org/pcap.html, 2002, (8 pages).
D'Antonio et al., Flow Selection Techniques, Internet Engineering Task Force (IETF), Request for Comments: 7014, Sep. 2013 (33 pages).
$EMC^2$—RSA Security Analytics Infastructure Data Sheet, 2014, (4 pages).
IP Copper USC10G3, 10-GbE Packet Capture Appliance with Bypass and GPS. Product Manual, Version 1.0, 2014 (27 pages).
Lamping et al., Wireshark User's Guide for Wireshark 1.99, 2014 (207 pages).
McCanne et al., The BSD Packet Filter: A New Architecture for User-level Packet Capture, Dec. 19, 1992, 11 pages.
Netscout, nGenius Collector 3300 Appliance Data Sheet, dated Mar. 2014 (4 pages).
Paxson et al., An Architecture for Exploiting Multi-Core Processors to Parallelize Network Intrusion Prevention, International Computer Science Institute, IEEE Sarnoff Symposium at Princeton NJ, Apr. 2007 (7 pages).
Quittek et al., Information Model for IP Flow Information Export, Request for Comments: 5102, Jan. 2008 (171 pages).
Srinivasan, et al, Fast address lookups using controlled prefix expansion, ACM Transactions on Computer Systems (TOCS) vol. 17, No. 1, Feb. 1999, pp. 1-40.
TCPDUMP, Manpage of TCPDUMP, Section: User Commands, updated Jul. 11, 2014, (22 pages).
Trammell et al., Bidirectional Flow Export Using IP Flow Information Export, Request for Comments: 5103, Jan. 2008 (24 pages).
Wikipedia, NetFlow, last modified Jun. 27, 2014, http://en.wkipedia.org/wki/NetFlow, Jun. 27, 2014, (11 pages).
Wireshart Wiki—Libpcap File Format, http://wiki.wireshark.org/Development/LibpcapFileFormat, 2014 (4 pages).

EFFICIENT ACCESS TO SPARSE PACKETS IN LARGE REPOSITORIES OF STORED NETWORK TRAFFIC

RELATED APPLICATION

The present application is a continuation of U.S. patent application Ser. No. 14/614,985, entitled Efficient Access to Sparse Packets in Large Repositories of Stored Network Traffic, filed on Feb. 5, 2015 by Dennis Lee Edwards et al., which application claims priority from Provisional Patent Application No. 61/942,370, entitled System and Method for Efficient Access to Sparse Packets in Large Repositories of Stored Network Traffic, filed on Feb. 20, 2014, the contents of which are incorporated herein by reference.

BACKGROUND

Technical Field

The present disclosure relates to the storage and retrieval of temporally organized computer network traffic, such as packet data.

Background Information

A computer network is a communications network allowing attached devices, such as nodes, to exchange network traffic. The traffic exchanged among the nodes on the network is broken up into packets. Software and hardware capture devices may capture these packets and use various formats for storing the packets. Common to all formats are standard attributes describing the data encapsulated in the packets and the network nodes where the traffic is visible. Because of its simplicity, flexibility, and portability, the packet capture (PCAP) format has become the de facto standard for packet storage.

Modern computer networks support hundreds of nodes transferring multiple gigabytes of data each second, which can generate a large amount of network traffic in a very short amount of time. Many capture devices record the network traffic in chronological order as packets are extracted from the network. Modern disk access times and processing power helps speed the search for data, but physical limitations remain a limiting factor. To avoid discarding data, writing newly captured packets may be given priority access to resources, thereby reducing the resources available for search and retrieval tasks. One approach for searching and retrieving packet data is to perform a sequential (linear) search of the data, comparing each packet to a filter describing the target criteria, which may be time consuming and inefficient. Indexing may be used to reduce search time requirements at the cost of significant overhead to create and store indices. However, these indices themselves may constitute a relatively large amount of information that must be searched to locate packets of interest, thereby reducing the benefit of the indexing itself. Therefore, a technique to reduce the index search is needed.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

Figure 1:
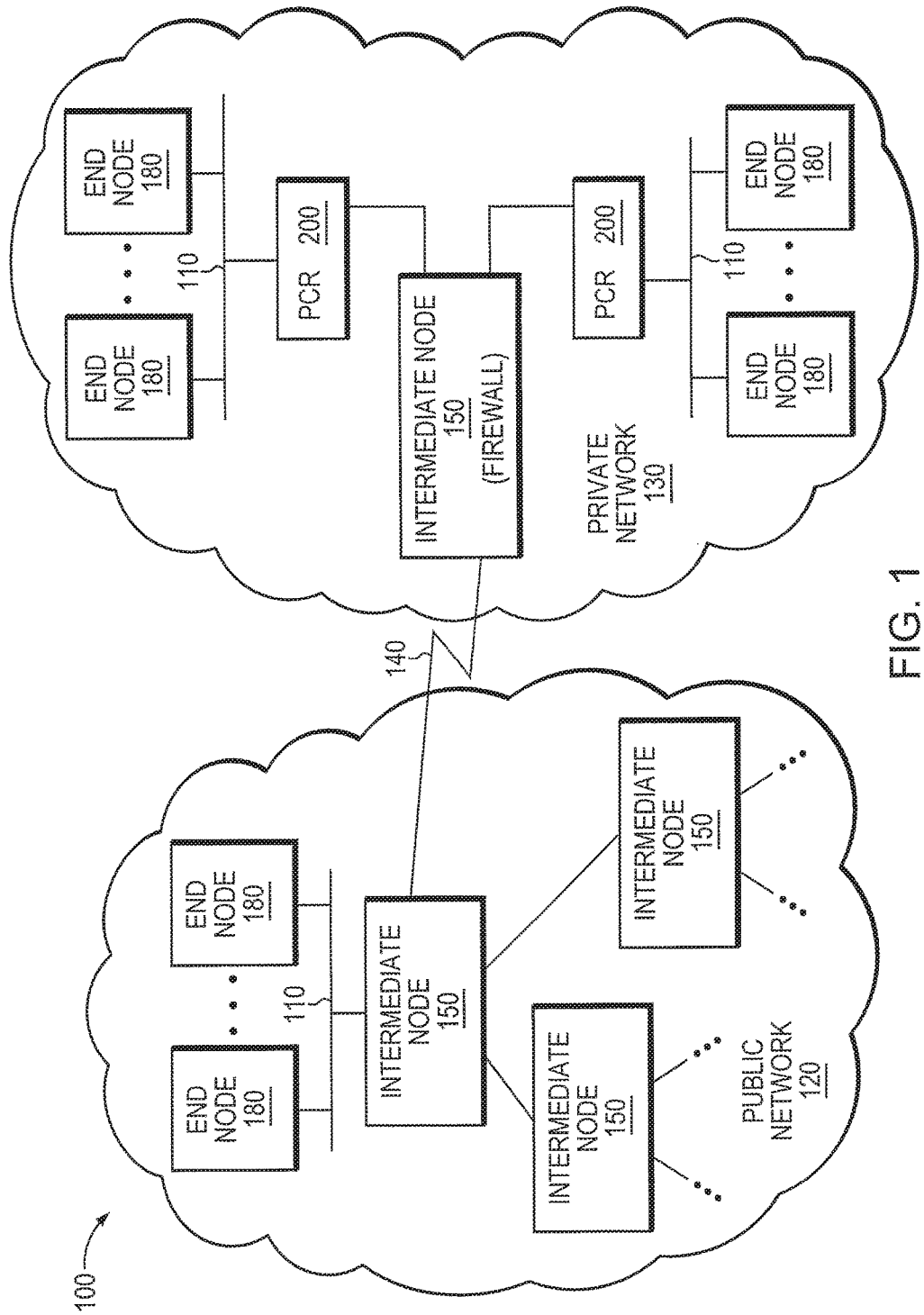
FIG. 1 is a block diagram of a network environment that may be advantageously used with one or more embodiments described herein.

Embodiments herein are directed to a secondary indexing technique that cooperates with primary indices of an indexing arrangement to enable efficient storage and access of metadata used to retrieve packets persistently stored in data files of a data repository. Efficient storage and access of the metadata used to retrieve the persistently stored packets may be realized through use of a target value included in the packets over a search time window. The metadata is illustratively organized as a metadata repository of primary index files that store the primary indices containing hash values of network flows of the packets, as well as paths and offsets to those packets stored in the data files. The technique includes one or more secondary indices having a plurality of present bits arranged in a binary format (e.g., a bit array) to indicate the presence of the target value in one or more packets stored in the data files over the search time window. Notably, the present bits may be used to reduce (i.e., "prune") a relatively large search space of the stored packets (e.g., defined by the hash values) to a pruned search space of only those data files in which packets having the target value are stored. That is, instead of indicating which data files store the packets having the target value over the time window, the present bits may be employed to prune (i.e., ignore or remove from the search space) those data files in which such packets are not stored.

In an embodiment, the packets are intercepted (captured) by a packet capture engine from a network and recorded in packet capture (PCAP) formats. Each captured packet is annotated with a time-stamp specifying an arrival time to enable recording of the packets into a set of the data files (e.g., PCAP files) organized at predetermined intervals, e.g., one second. Illustratively, captured packets with a time stamp of an interval between the beginning of a second and the beginning of a next second are stored in one of the PCAP files dedicated to that one second interval. The primary indices for the packets captured in the each second interval are stored in a primary index file associated with that PCAP file dedicated to that second interval. Thus, all PCAP files and primary index files are aligned on one second intervals.

In an embodiment, an ordered sequence of the present bits of each secondary index may be used to represent the presence of the target value in packets of the set of PCAP files over the search time window. Illustratively, each present bit may correspond to a primary index file and its associated PCAP file of a one second interval. Moreover, the binary value of the present bit (e.g., an asserted binary value of 1) in the ordered sequence may indicate the presence of the target value in at least one packet of the associated PCAP file. Since each PCAP file contains packets time stamped for a single second, the asserted binary values of an ordered sequence of 3600 present bits may be used to identify those PCAP files that contain at least one packet having the target value within a search time window of, e.g., one hour. Illustratively, the secondary indices for the set of PCAP files and primary index files are stored in secondary index files, each of which is associated with the search time window.

Advantageously, the secondary indexing technique enables space-efficient storage of the secondary indices and time-efficient retrieval of packets stored in a data repository. That is, organization of data and metadata (e.g., present bits representing target values present in packets) into fine-grained intervals (e.g., one second intervals) enables substantial elimination of the data (e.g., reducing repeated target values) with a reasonable amount of overhead. Illustratively, the amount of overhead may be reduced (and thus rendered "reasonable") by assigning one present bit to each one second interval, wherein the assertion of the bit indicates whether the target value was detected during the one second interval.

DESCRIPTION

FIG. 1 is a block diagram of a network environment 100 that may be advantageously used with one or more embodiments described herein. The network environment 100 illustratively includes a plurality of computer communications networks organized as a public network 120, such as the Internet, and a private network 130 (i.e., customer network), such as an organization, enterprise, or personal network. The networks 120, 130 illustratively include a plurality of network links and segments connected to a plurality of nodes. The network links and segments may include local area networks (LANs) 110 and wide area networks (WANs) 140, including wireless networks, interconnected by intermediate nodes 150 to form an internetwork of nodes, wherein the intermediate nodes 150 may include network switches, routers and/or one or more packet capture and retrieval systems (PCRs 200) described further herein. The LANs 110 may, in turn, interconnect end nodes 180 which, in the case of private network 130, may be illustratively embodied as endpoints.

In an embodiment, the endpoints may illustratively include, e.g., client/server desktop computers, laptop/notebook computers, process controllers, medical devices, data acquisition devices, mobile devices, such as smartphones and tablet computers, and/or any other intelligent electronic device having network connectivity that may be configured to implement a virtualization system. The nodes illustratively communicate by exchanging packets or messages (i.e., network traffic) according to a predefined set of protocols, such as the Transmission Control Protocol/Internet Protocol (TCP/IP); however, it should be noted that other protocols, such as the HyperText Transfer Protocol (HTTP), may be advantageously used with the embodiments herein. In the case of private network 130, the intermediate node 150 may include a firewall or other network device configured to limit or block certain network traffic to protect the endpoints from unauthorized users.

Figure 2:
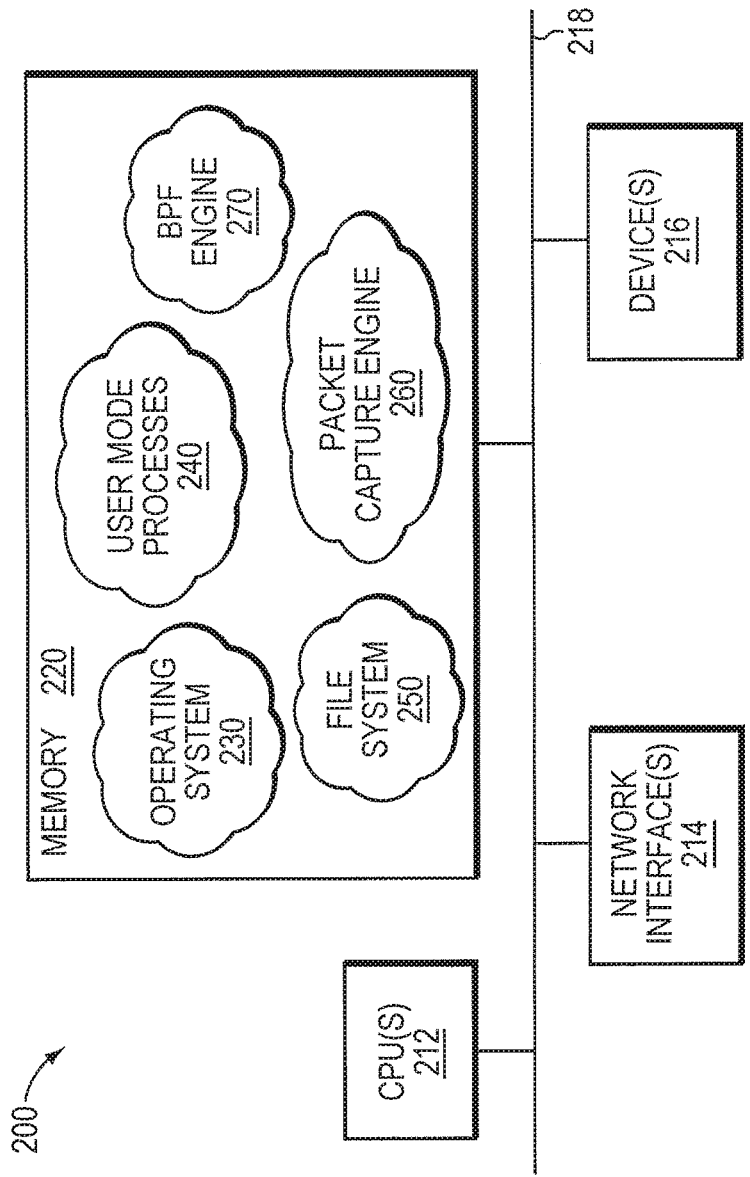
FIG. 2 is a block diagram of an intermediate node that may be advantageously used with one or more embodiments described herein.

FIG. 2 is a block diagram of an intermediate node that may be advantageously used with one or more embodiments described herein. The intermediate node is illustratively embodied as PCR 200 and includes one or more central processing units (CPUs) 212, a memory 220, one or more network interfaces 214 and one or more devices 216 connected by a system interconnect 218, such as a bus. The devices 216 may include various input/output (I/O) or peripheral devices, such as storage devices (e.g., disks) organized as storage (e.g., data and metadata) repositories of volumes and files embodied as secondary storage. The disks may be solid state drives (SSDs) embodied as flash storage devices or other non-volatile, solid-state electronic devices (e.g., drives based on storage class memory components), although in an embodiment, the disks may be hard disk drives (HDDs). Each network interface 214 may contain the mechanical, electrical and signaling circuitry needed to connect the node to the network 130 to thereby facilitate communication over the network. To that end, the network interface 214 may be configured to transmit and/or receive messages using a variety of communication protocols including, inter alia, TCP/IP and HTTP.

The memory 220 may include a plurality of locations that are addressable by the CPU(s) 212 and the network interface(s) 214 for storing software program code (including application programs) and data structures associated with the embodiments described herein. The CPU 212 may include processing elements or logic adapted to execute the software program code and application programs, such as packet capture engine 260 and Berkeley Packet Filter (BPF) engine 270, and manipulate the data structures. Exemplary CPUs may include families of instruction set architectures based on the x86 CPU from Intel Corporation of Santa Clara, Calif. and the x64 CPU from Advanced Micro Devices of Sunnyvale, Calif.

An operating system 230, portions of which are typically resident in memory 220 and executed by the CPU, functionally organizes the node by, inter alia, invoking operations in support of the software program code and application programs executing on the node. A suitable operating system 230 may include the Linux operating system, although the Unix operating system and Windows series of operating systems, among others, may also be used. The operating system 230 illustratively implements a high-level module, such as a file system 250, to logically organize the information as a hierarchical structure of named storage containers, such as directories, files and/or volumes that hold the files. A suitable file system 250 may include the XFS file system, although other file systems capable of high I/O operations per second (IOPs) and throughput, such as EXT4, may be used. Illustratively, the software program code may be implemented as user mode processes 240 of the operating system 230. As used herein, a process (e.g., a user mode process) is an instance of software program code (e.g., an application program) executing in the operating system that may be separated (decomposed) into a plurality of threads, wherein each thread is a sequence of execution within the process.

It will be apparent to those skilled in the art that other types of processing elements and memory, including various computer-readable media, may be used to store and execute program instructions pertaining to the embodiments described herein. Also, while the embodiments herein are described in terms of software program code and application programs stored in memory, alternative embodiments also include the code/programs being embodied as engines or modules consisting of hardware, software, firmware, or combinations thereof.

Figure 3:
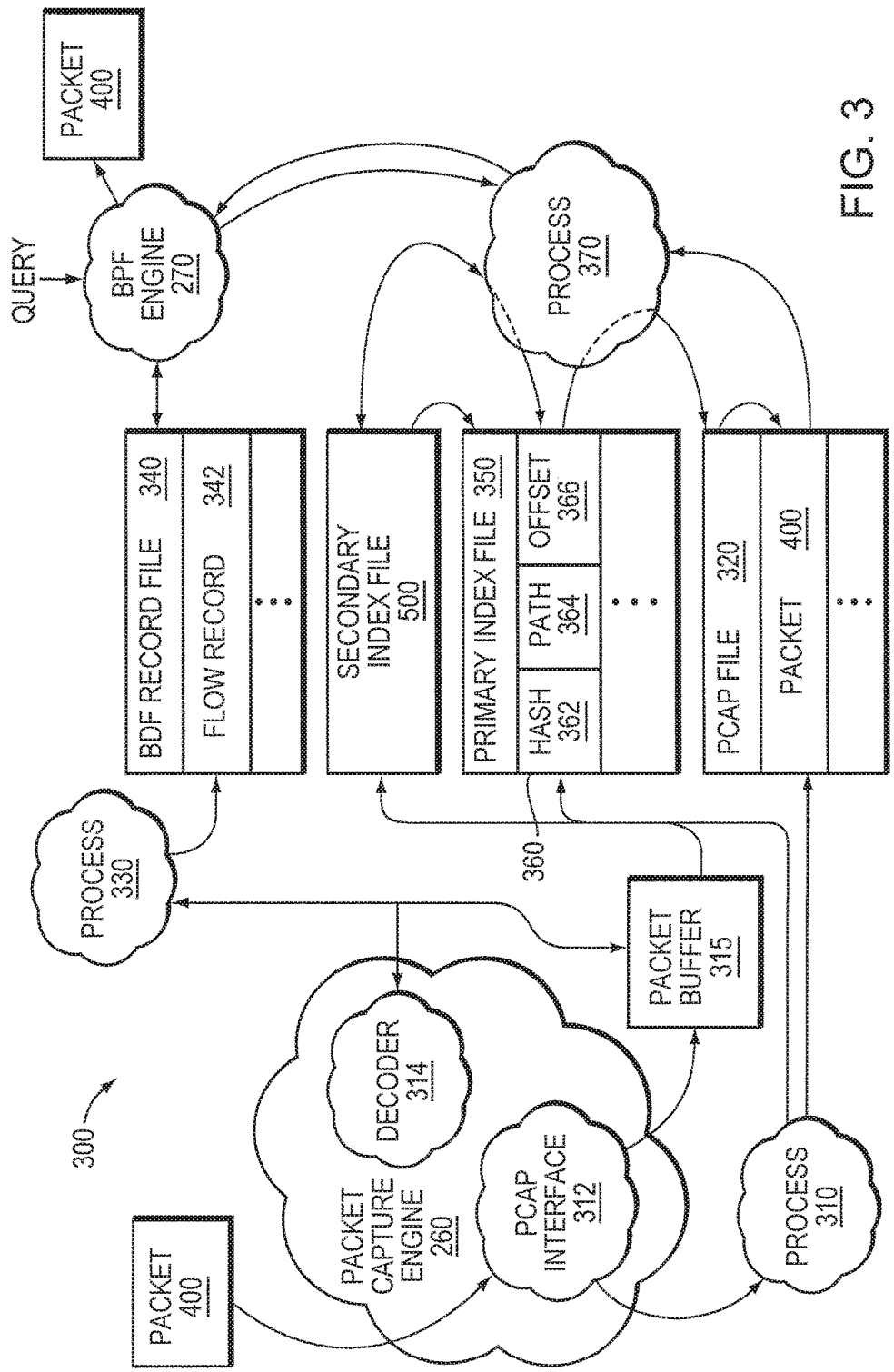
FIG. 3 illustrates an exemplary processing environment configured to provide an indexing arrangement.

FIG. 3 illustrates an exemplary processing environment configured to provide an indexing arrangement according to one or more embodiments described herein. In an embodiment, the environment 300 includes a packet capture and storage stage having packet capture engine 260 configured to generate primary indices based on network flows of captured packets. Packets 400 are captured by a PCAP interface 312 (e.g., libpcap or other appropriate interfaces) of the packet capture engine 260 and organized as a packet buffer 315 of a predetermined size, e.g., one (1) MB, for processing by a decoder 314, which decodes (and hashes) the network flow of each packet. A hash function is applied to predefined protocol fields (such as fields of the Ethernet headers including TCP/IP) to calculate a hash value that enables indexing and look up (search) of packets associated with the network flow. In an embodiment, the hash function is a CRC-32C function, although other hashing functions may be used. The hash function may be applied to portions of the protocol fields sufficient to identify a captured packet with a low incidence of hash collision. Illustratively, the hash function may be applied to the network flow of a packet, wherein the network flow is defined as source and destination IP (layer 3) addresses, source and destination port (layer 4) numbers, and protocol address family (AF) type of the packet. However, hashing may be alternatively performed on other search parameters, such as one or more IP addresses (e.g., without ports) or Ethernet addresses if the IP protocol is not present. A process 310 may then cooperate with the packet capture engine 260 to write (copy) the packets 400 to the data repository, e.g., a PCAP file 320 of a set of PCAP files on a first volume of the disks.

Figure 4:
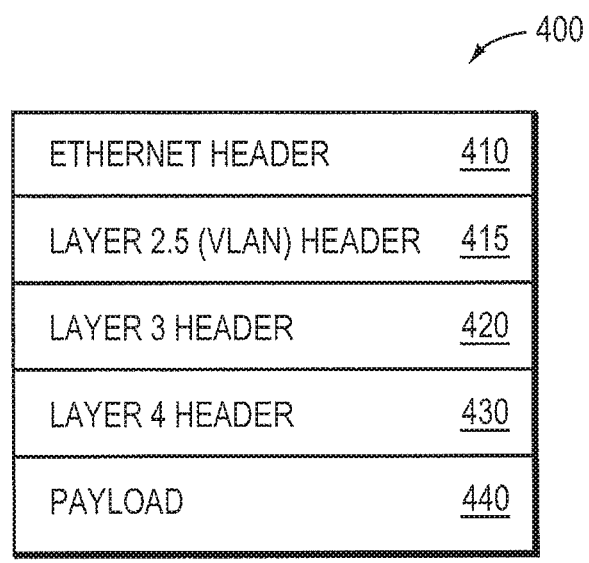
FIG. 4 is a block diagram illustrating a format of a generic network packet, such as a conventional Ethernet packet.

FIG. 4 is a block diagram illustrating a format of a generic network packet, such as a conventional Ethernet packet 400, having a plurality of headers, each of which includes a plurality of fields. The headers include an Ethernet header 410, a layer 2.5 virtual LAN (VLAN) header 415 (which may or may not be present in the packet 400) and a layer 3 header 420 that commonly contains Internet Protocol (IP) data. Note that the size of the IP header 420 differs between versions 4 and 6 of the IP protocol. Another header includes a layer 4 header 430 whose size is illustratively determined, in part, by the layer 4 protocol, e.g., TCP, that is used. The remaining field of the packet 400 is a payload 440 containing data being transmitted. The size of the packet payload 440 may range from empty to a limit computed from a maximum transmission unit (MTU) for the network segment over which the packet travels.

The packet buffer 315 is then passed to a process 330, which processes each packet's headers to form a bi-directional flow record, i.e., a PCAP metadata record (flow record 342), which is then copied to the flow metadata repository, e.g., a Bi-Directional Flow (BDF) record file 340, on a second volume of the disks. Two different volumes are illustratively used to store the PCAP flow records 342 and the captured packets 400 so as to enable concurrent searching (queries) and retrieval of the flow records 342, while copying (writing) packets 400. That is, the PCAP file 320 may be written to the first volume (data repository), while the BDF record file 340 may be written to the second volume (flow metadata repository). Such concurrent (parallel) processing enables searching and retrieving of the indices, including the hash values (within a small file) and copying of the packets (to a large file) at substantially the same time (e.g., substantial overlap of processing) to realize an approximate 10 Gb/sec full duplex rate (i.e., 20 Gb per second) of the network link. Note that every bi-directional flow metadata record is a fixed length so that search and retrieval operations may be controlled (i.e., efficient striding).

In an embodiment, the process 310 may also create primary indices (based on the hashes of the network flows) and may obtain (i.e., cross-reference) locations (including offsets) of the packets 400 in the PCAP file 320 on the first volume (i.e., data repository), as well as paths to the PCAP file 320. That is, the primary indices may include a path to the PCAP file 320 and an offset within the file to locate the packet 400. Illustratively, the process 310 may index each packet 400 by tagging it with the calculated hash, a path and an offset. The process 310 may copy (load) the information, i.e., hash value 362 along with path 364 and offset 366, as an entry 360 (hereinafter "primary index 360") into a different metadata repository (index metadata repository), e.g., a primary index file 350, which contains other entries of indices that point to (reference) captured packets 400, including original payloads, stored in the PCAP file 320, as well as other metadata attributes such as packet direction. In an embodiment, there may be a plurality of PCAP files 320, wherein each file 320 has an associated primary index file 350. Each PCAP file 320 may be identified by a path 364 formed from a stream and a time stamp relating to the time of capture (e.g., in nanoseconds) of a packet 400. Illustratively, a naming convention for each PCAP (packet) file 320 may be based on the time stamp (e.g., a time group) and the stream, which is illustratively a "channel" used to write packets 400 to the PCAP packet file 320. For example, an embodiment may include four streams, wherein each stream is represented by a directory (e.g., streams 0-3) and wherein each stream is mapped to a CPU 212 (e.g., a processor core) to enable concurrent processing, i.e., parallel writing and retrieval from the first volume (i.e., data repository). The stream and time stamp thus cooperate to provide a full path name to the PCAP file 320 containing the desired packet 400.

Embodiments herein are directed to a secondary indexing technique that cooperates with primary indices of an indexing arrangement to enable efficient storage and access of metadata used to retrieve packets persistently stored in data files of a data repository. Efficient storage and access of the metadata used to retrieve the persistently stored packets may be realized through use of a target value included in the packets over a search time window. As used herein, a search time window represents a specific duration, e.g., one hour. The metadata is illustratively organized as a metadata repository of primary index files that store the primary indices containing hash values of network flows of the packets, as well as paths and offsets to those packets stored in the data files. The technique includes one or more secondary indices having a plurality of present bits arranged in a binary format (e.g., a bit array) to indicate the presence of the target value in one or more packets stored in the data files over the search time window. Notably, the present bits may be used to reduce (i.e., "prune") a relatively large search space of the stored packets (e.g., defined by the hash values) to a pruned search space of only those data files in which packets having the target value are stored. That is, instead of indicating which data files store the packets having the target value over the time window, the present bits may be employed to prune (i.e., ignore or remove from the search space) those data files in which such packets are not stored.

In an embodiment, the packets are intercepted (captured) by the packet capture engine 260 from the network 130 and recorded in PCAP formats. Each captured packet 400 is annotated with a time-stamp specifying an arrival time at the PCR 200 to enable recording of the packets into a set of the data files (e.g., PCAP files 320) organized at predetermined intervals, e.g., one second. Illustratively, captured packets with a time stamp of an interval between the beginning of a second and the beginning of a next second are stored in one of the PCAP files 320 dedicated to that one second interval. In other words, all packets captured in an initial second interval are recorded to an initial PCAP file of the set of PCAP files, and all packets captured in a next second interval are recorded to a next PCAP file. The primary indices 360 for the packets captured in the each second interval are stored in a primary index file 350 associated with that PCAP file 320 dedicated to that second interval. Thus, all PCAP files and primary index files are aligned on one second intervals (i.e., boundaries).

In an embodiment, an ordered sequence of the present bits of each secondary index may be used to represent the presence of the target value in packets of the set of PCAP files over the search time window. Illustratively, each present bit may correspond to a primary index file 350 and its associated PCAP file 320 of a one second interval. Moreover, the binary value of the present bit (e.g., an asserted binary value of 1) in the ordered sequence may indicate the presence of the target value in at least one packet of the associated PCAP file. Since each PCAP file contains packets time stamped for a single second, the asserted binary values of an ordered sequence of 3600 present bits may be used to identify those PCAP files that contain at least one packet having the target value within a search time window of, e.g., one hour. Illustratively, the secondary indices for the set of PCAP files and primary index files are stored in secondary index files 500, each of which is associated with the search time window.

The primary indices 360 of the primary index files 350 are illustratively created, e.g., by process 310 of the packet capture and storage stage, during the recording of the captured packets 400 in the PCAP files 320. As the primary index files are created, the process 310 may also create each secondary index file 500 based on the presence of a target value in at least one packet of each PCAP file. As noted, creation of the primary indices 360 involves hashing of predefined protocol fields, such as fields of the network flow, of a packet 400 to calculate a hash value 362. In an embodiment, the target value may be an element of the network flow, such as IP address, although other commonly-searched target values, such as port number, may be used. The target value (e.g., IP address) is therefore known at the time of creation of the primary indices 360 and recording of the captured packets 400. Illustratively, the presence of the target value in at least one packet of each PCAP file 320 may be recorded as one or more secondary indices in one or more data structures of each secondary index file 500 in a manner that facilitates quick and efficient searching.

Figure 5:
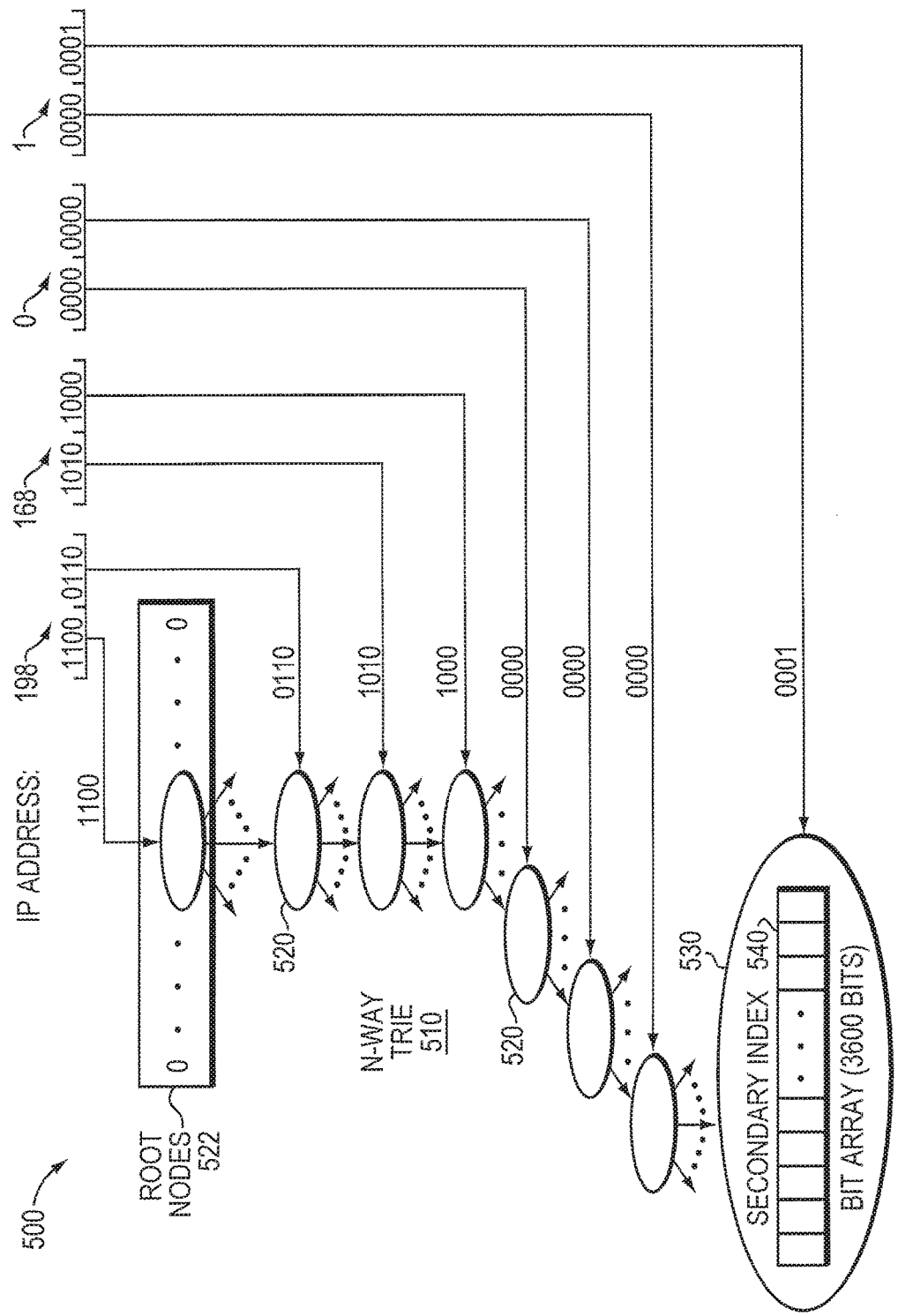
FIG. 5 is a diagram of a secondary index file.

FIG. 5 is a diagram of a secondary index file. In an embodiment, the secondary index file 500 is organized as one or more n-way (hexadecimal) trie data structures ("n-way trie 510") that store the secondary indices 540 over a search time window, e.g., one hour. As noted, each secondary index 540 includes a bit array having an ordered sequence of the bits (e.g., 3600 bits), each of which represents a portion of the time window, e.g., one second interval of an hour. As the captured packets are recorded in the PCAP file, the bits of the bit array may be set (asserted/not asserted) depending upon the presence of the target value in at least one packet of the file. Illustratively, the n-way trie 510 of the secondary index file 500 is organized on a target value basis for each commonly-searched target value, e.g., IP address. However, it should be further noted other types of data structures, e.g., AVL trees, heaps, and hash trees, may be advantageously used as the secondary index file so long as the target value may be resolved (i.e., searched) using the data structure and that the sequence of bits associated with the target value may be accessed.

For example, assume a target value is equal to an IPv4 address illustratively represented in dotted-decimal notion as 198.168.0.1. Since the IPv4 address is a 32-bit target value, the n-way trie 510 may be organized as eight (8) levels, wherein seven (7) of the levels are formed of internal nodes 520 (including root nodes 522) and one (1) of the levels is formed of leaf nodes 530. Each internal node 520 is composed of an array of sixteen (16) elements accessible (indexed) by 4-bit "nibble" keys formed from subsets of the target value. Thus, the IPv4 address target value 198.168.0.1 may be represented in binary format as:

1100 0110.1010 1000.0000 0000.0000 0001 wherein the most significant nibble key is 1100, and the least significant nibble key is 0001. In an embodiment, the 4-bit nibble keys are defined by the positions of their associated nodes in the n-way trie 510, and all descendants of a node have a common prefix of the key associated with that node. In other words, each of the 16 elements of an internal node 520 contains a 4-bit nibble key of a child of the internal node. Each leaf node 530 contains a secondary index 540 formed from the 3600 bit array indicating at which one second interval (file) the target value was seen during the hour. Similarly, an IPv6 address having a 128-bit address may be represented as thirty-two (32) 4-bit nibbles using a 16-way trie with 32 levels. It will be understood by persons of skill in the art that other n-way trie arrangements such as a 32- or 64-way trie may be used for target values having a large number of bits. It should be noted that, in an alternative embodiment wherein the target value is equal to a 16-bit port number, the trie 510 may be organized as four (4) levels, wherein three (3) of the levels are formed of internal nodes and one (1) of the levels is formed of leaf nodes indexed by 4-bit nibble keys.

The n-way trie 510 (and secondary index file 540) may be persistently stored on disk, e.g., in the index metadata repository, in an efficient manner by only storing leaf nodes 530 having one or more asserted present bits of the secondary index 540, thereby indicating that the target value was detected in at least one packet of the PCAP files 320 during the search time window, e.g., an hour. In other words, the secondary indexing technique described herein achieves a goal of efficiency by (1) only storing asserted present bits that represent minute PCAP files having the target value, and (2) only storing parts (e.g., branches) of the trie 510 that contain leaf nodes having asserted present bits. If a branch of the trie does not contain the asserted bits, that branch is not persistently stored on disk. Using the target value as search criteria, the latest hour-based, secondary index file 500 that was persistently stored may be examined to determine whether the target value appeared within any packets captured during that hour. For a worst case scenario, each captured packet 400 that is recorded during the hour may have a different target value (e.g., IP address) and, as a result, the n-way trie 510 may become large. Yet, for a best case scenario, packets 400 having the same IP address may be recorded during the hour such that the trie may be small. Note that if a target value (IP address) was not detected in any captured packets 400 during the search time window, a subsequent search query for packets having the target value may be quickly resolved since no secondary indices 540 (leaf nodes 530) would be recorded in the trie 510 of the secondary index file 500 dedicated to that time window.

A header file associated with the n-way trie 510 of the secondary index file 500 may also be persistently stored on disk, e.g., in the index metadata repository. In an embodiment, the header file may contain (1) a time stamp of the earliest second within the search time window (e.g., hour epoch value) associated with the secondary index file 500, (2) the number (node count) of internal nodes 520 allocated in the trie 510, (3) the number (leaf count) of leaf nodes 530 allocated in the trie, and (4) pointers to in-memory lists, i.e., (internal) node list and (leaf node) leaf list, indicating where the allocated nodes begin. By maintaining a count of nodes allocated (used) in the tree and allocating those nodes sequentially, a determination of the number of nodes (to be) written to disk can be easily and efficiently rendered. Note that larger n-way tries have proportionately larger number of pointers to beginning in-memory allocated nodes.

Figure 6:
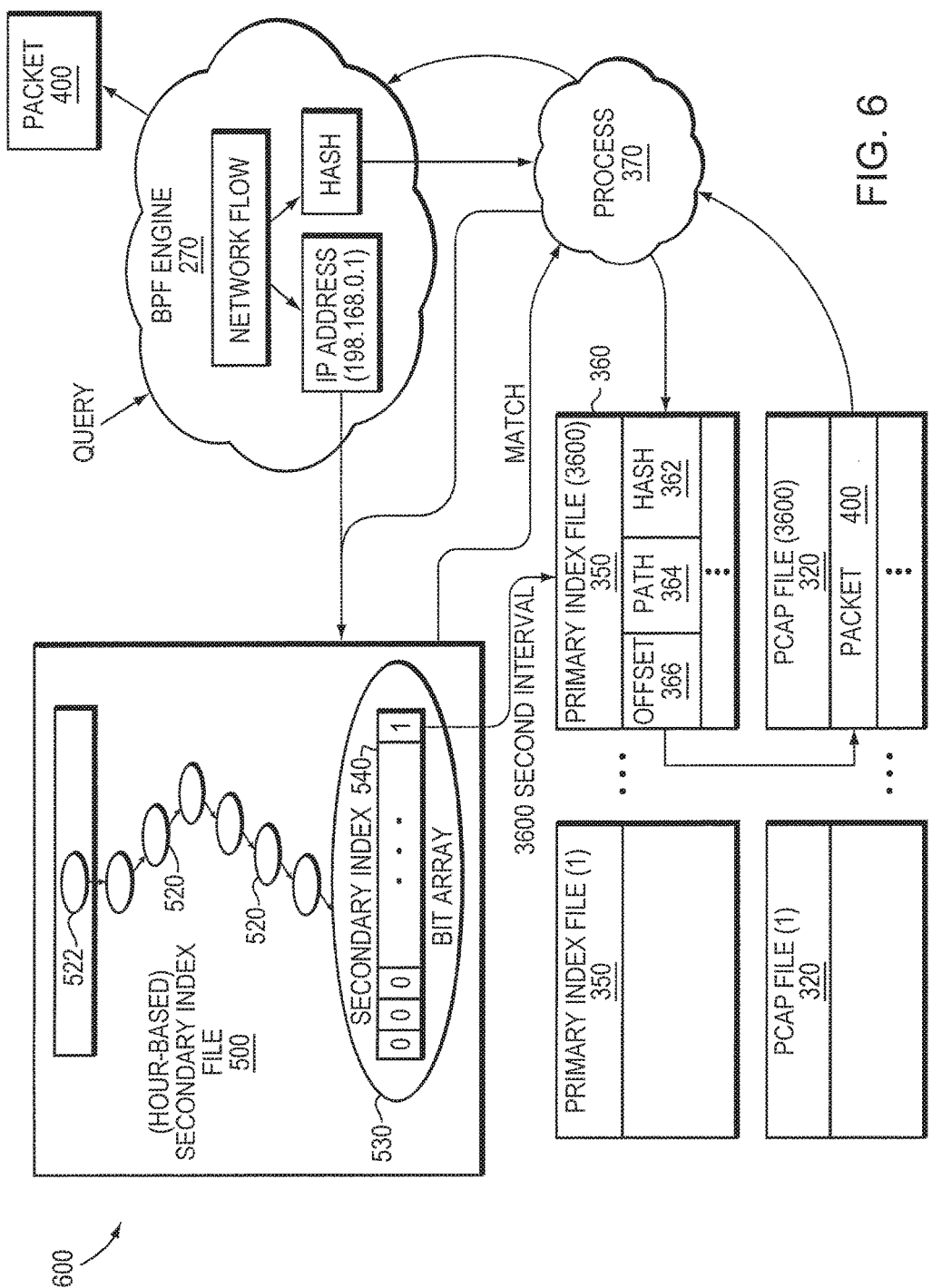
FIG. 6 is a block diagram illustrating a secondary indexing technique.

A query and retrieval stage of the processing environment 300 may include a BPF engine 270 configured to use the secondary index file 500 to access one or more captured packets 400 in accordance with the secondary indexing technique. FIG. 6. is a block diagram illustrating the secondary indexing technique 600. Assume a user requests retrieval of any captured packets 400 having a target value, such as a "seldom-seen" IP address, of a network flow within a search time window, e.g., the latest hour. The user may issue a BPF query (e.g., having a BPF expression of the IP address) to the BPF engine 270, which may compile the expression and cooperate with a process 370 to search the latest hour-based, secondary index file 500 in order to match the IP address with one or more secondary indices 540 of the n-way trie 510 of file 500. The process 370 may use the one or more matching secondary indices 540 to acquire one or more appropriate primary indices 360 identifying exact locations of the captured packets. The process 370 may then retrieve any captured packets 400 matching the IP address of the network flow to thereby enable fast and efficient searching of the data and metadata repositories to locate such a seldom-seen (i.e., infrequently detected) target value.

Assume the seldom-seen target value is an IPv4 address, illustratively represented as 198.168.0.1 ("1100 0110.1010 1000.0000 0000.0000 0001"). Referring also to FIG. 5, the process 370 may utilize the most significant nibble key of the IPv4 address to locate the root node 522 corresponding to the 4-bit nibble key 1100, and then proceed to utilize each successive nibble key (e.g., 0110, 1010, 1000, etc.) to traverse the internal nodes 520 of the n-way trie 510 until reaching the leaf node 530 corresponding to the least significant nibble key 0001. Since the secondary index file 500 includes a branch of the trie 510 defined by the collection of nibble keys, the target value was detected in at least one captured packet 400 during the search time window (hour) dedicated to the secondary index file 500, resulting in a match of the IP address with a secondary index 540.

Assume now that the bit array of the matching secondary index 540 of leaf node 530 has a present bit asserted for the 3600$^{th}$ second interval of the hour. The process 370 may thus access the primary index file 350 dedicated to the 3600$^{th}$ second interval to thereby prune the search space (i.e., hash space of the network flow) based on the IPv4 address target value. The process 370 may then use the paths 364 and offsets 366 of the primary indices 360 having the hash values defined by the pruned search space to retrieve the captured packets having the target value from the PCAP files of the data repository. Specifically, the process 370 may utilize the hash value of the network flow (which was previously generated) to search the primary indices 360 of the dedicated primary index file 350. For every primary index 360 having a hash value field 362 that matches the hash value of the network flow, the path 364 to the PCAP file 320 dedicated to the 3600th second interval and an offset 366 into that file are used to access the captured packet 400 having the target value.

Advantageously, the secondary indexing technique enables space-efficient storage of the secondary indices and time-efficient retrieval of packets stored in the data repository. That is, organization of data and metadata (e.g., present bits representing target values present in captured packets) into fine-grained intervals (e.g., one second intervals) enables substantial elimination of the data (e.g., reducing repeated target values) with a reasonable amount of overhead. Illustratively, the amount of overhead may be reduced (and thus rendered "reasonable") by assigning one present bit to each one second interval, wherein the assertion of the bit indicates whether the target value was detected during the one second interval. As a result, the technique described herein quickly determines when and where the target value was detected by providing a fast search that "prunes" the searched hash space to eliminate primary index files 350 and associated PCAP files 320 which do not contain packets having the target value.

While there has been shown and described illustrative embodiments of a secondary indexing technique that cooperates with primary indices of an indexing arrangement to enable efficient storage and access of metadata used to retrieve packets persistently stored in data files of a data repository, it is to be understood that various other adaptations and modifications may be made within the spirit and scope of the embodiments herein. For example, embodiments have been shown and described herein with relation to leaf nodes of the n-way trie containing secondary indices formed from an ordered sequence of a 3600 bit array. However, the embodiments in their broader sense are not so limited and may, in fact, allow for the leaf nodes to contain additional metadata, such as number of captured packets containing the target value. Such additional metadata may be stored in the leaf nodes to provide a summary of the recorded packets. Note that the additional metadata is generally not used for searching; only the present bits of the bit array are needed to indicate the presence of the target value in indexed fields of at least one captured packet in accordance with the secondary indexing technique.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks, electronic memory, and/or CDs) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:

capturing a first packet from a network;

annotating the first packet with a time stamp specifying an arrival time of the first packet at a packet capture system coupled to the network;

storing the first packet in a first data file of a set of data files associated with predetermined intervals, the first data file corresponding to a first predetermined interval based on the time stamp;

creating a first primary index for the first packet, the first primary index containing a location to the first packet stored in the first data file on a storage device of the packet capture system;

storing the first primary index for the first packet in a first primary index file associated with the first data file corresponding to the first predetermined interval; and creating a secondary index for the first packet, the secondary index having an ordered sequence of present indicators, wherein a first present indicator corresponds to the first primary index and the first data file of the first predetermined interval.

2. The method of 1 wherein the first present indicator denotes an element of a network flow present in the first packet over a search time window.

3. The method of 2 wherein the element is one of an internet protocol address and a port number.

4. The method of claim 1 further comprising storing the secondary index in a secondary index file associated with a search time window.

5. The method of claim 4 wherein storing the secondary index in the secondary index file comprises organizing the secondary index file as a data structure that stores the secondary index over the search time window.

6. The method of claim 5 wherein the data structure is a n-way trie and wherein the n-way trie is organized based on a target value.

7. The method of claim 6 further comprising organizing the n-way trie as a plurality of internal nodes and leaf nodes, wherein each internal node is composed of an array of elements accessible by keys formed from subsets of the target value.

8. The method of claim 7 wherein each element of each internal node contains a key of a child of the internal node and wherein one of the leaf nodes contains the secondary index.

9. The method of claim 8 further comprising storing the n-way trie of the secondary index file on the storage device by only storing the leaf node having the first present indicator of the secondary index.

10. The method of claim 9 further comprising storing a header file associated with the n-way trie of the secondary index file on the storage device, the header file containing one of the time stamp of an earliest second within the search time window associated with the secondary index file, a number of internal nodes allocated in the n-way trie, and the number of leaf nodes allocated in the n-way trie.

11. The method of claim 1 wherein each of the predetermined intervals is one second, and wherein the time stamp of the first packet comprises the first predetermined interval between a beginning of a second and the beginning of a next second corresponding to the first data file.

12. The method of claim 11 wherein each data file of the set of data files contains packets captured from the network and annotated with time stamps at the predetermined intervals of seconds.

13. The method of claim 12 wherein the ordered sequence comprises 3600 present indicators and wherein the search time window is an hour.

14. The method of claim 13 wherein asserted binary values of the 3600 present indicators within the ordered sequence identify the data files of the set of data files that contain at least one packet having a target value within the search time window of the hour.

15. A method comprising:
capturing a packet from a network;
annotating the packet with a time stamp specifying an arrival time of the packet at a packet capture system coupled to the network;
storing the packet in a data file of a set of data files associated with predetermined intervals, the data file corresponding to a predetermined interval based on the time stamp;
creating a first primary index for the packet, the first primary index containing a location to the packet stored in the data file on a storage device of the packet capture system;
storing the first primary index for the packet in a first primary index file associated with the data file corresponding to the predetermined interval;
creating a secondary index for the packet, the secondary index having an ordered sequence of indicators, wherein a first indicator corresponds to the first primary index and the data file of the predetermined interval, wherein the indicator denotes presence of a target value in the packet;
organizing the secondary index file as a trie based on the target value; and
in response to a request to retrieve the packet having the target value, traversing the trie until reaching a leaf node of the trie containing the secondary index for the packet.

16. A system comprising:
one or more processors coupled to a network;
a plurality of storage repositories coupled to the one or more processors, the storage repositories including a data repository having data files configured to store packets captured from the network and a metadata repository having primary and secondary index files configured to store primary and secondary indices, the primary indices having hash values along with locations to the captured packets stored in the data files, the hash values calculated from a hash function applied to network flows of the captured packets, the secondary indices having a plurality of indicators denoting presence of a target value in one or more of the captured packets; and
a memory coupled to the one or more processors and configured to store one or more processes of an operating system, the one or more processes executable by the one or more processors to use the indicators of the secondary indices to prune a search space of the captured packets as defined by the hash values to a pruned search space of only the data files of the data repository storing captured packets having the target value, the one or more processes further executable to use the locations of the primary indices having the hash values defined by the pruned search space to retrieve the captured packets having the target value from the data repository.

17. The system of claim 16 wherein the target value is an element of a network flow over a search time window.

18. The system of claim 16 wherein the secondary index file is organized as a data structure that stores the secondary indices over a search time window.

19. The system of claim 18 wherein the data structure is a n-way trie having a plurality of internal nodes and leaf nodes, wherein each internal node is composed of an array of elements accessible by keys formed from subsets of the target value.

20. A method comprising:
capturing a first packet from a network;
annotating the first packet with a time stamp specifying an arrival time of the first packet at a packet capture system coupled to the network;
storing the first packet in a first data storage container corresponding to a first predetermined interval based on the time stamp;
creating a first primary index for the first packet, the first primary index containing a location to the first packet stored in the first data storage container on a storage device of the packet capture system;

storing the first primary index for the first packet in a first primary index storage container associated with the first data storage container corresponding to the first predetermined interval; and creating a secondary index for the first packet, the secondary index having an ordered sequence of present indicators, wherein a first present indicator corresponds to the first primary index and the first data storage container of the first predetermined interval.

21. The method of claim 20 wherein the first primary index storage container is arranged for access separate from the first data storage container.

22. The method of claim 20 further comprising storing the secondary index in a secondary index storage container associated with a search time window.

23. A non-transitory computer readable medium including program instructions for execution on one or more processors, the program instructions configured to:

capture a packet from a network;

annotate the packet with a time stamp specifying an arrival time of the packet;

store the packet in a data file of a set of data files associated with predetermined intervals, the data file corresponding to a predetermined interval based on the time stamp;

create a primary index for the packet, the primary index containing a location to the packet stored in the data file;

store the primary index for the packet in a primary index file associated with the data file corresponding to the predetermined interval; and create a secondary index for the packet, the secondary index having an ordered sequence of indicators, wherein an indicator corresponds to the primary index and the data file of the predetermined interval, and wherein the indicator denotes presence of a target value in the packet stored in the data file over a search time window.

* * * * *